US006113720A

United States Patent [19]

Fresnel

[11] Patent Number: 6,113,720

[45] Date of Patent: Sep. 5, 2000

[54] METHOD OF MARKING ARTICLES BY TRANSFER FROM A SLEEVE OF HEAT-SHRINKABLE PLASTICS MATERIAL WHICH IS SHRUNK ONTO THE ARTICLE, AND A SLEEVE DESIGNED FOR IMPLEMENTING SAID METHOD

[75] Inventor: Eric Fresnel, Paris, France

[73] Assignee: Sleever International Company, Morangis, France

[21] Appl. No.: 09/269,510

[22] PCT Filed: Oct. 1, 1997

[86] PCT No.: PCT/FR97/01732

§ 371 Date: Mar. 29, 1999

§ 102(e) Date: Mar. 29, 1999

[87] PCT Pub. No.: WO98/15469

PCT Pub. Date: Apr. 16, 1998

[30] Foreign Application Priority Data

Oct. 7, 1996 [FR] France .................................. 96 12182

[51] Int. Cl.[7] ...................................................... B32B 31/00

[52] U.S. Cl. ............................ 156/85; 206/807; 215/246; 428/347

[58] Field of Search ................................. 156/84, 85, 86, 156/230, 234; 174/DIG. 8; 206/807; 220/214; 215/246; 283/72, 81; 264/342 R; 428/347, 915, 916

[56] References Cited

U.S. PATENT DOCUMENTS

| | | | |
|---|---|---|---|
| 5,033,774 | 7/1991 | Benardelli . | |
| 5,292,018 | 3/1994 | Travisano . | |
| 5,641,084 | 6/1997 | Rice | 215/246 |
| 5,795,209 | 8/1998 | Moore | 446/73 |
| 6,020,823 | 2/2000 | DeCicco | 340/691.2 |

FOREIGN PATENT DOCUMENTS

| | | |
|---|---|---|
| 0 345 405 | 12/1989 | European Pat. Off. . |
| 93-19445 | 9/1993 | WIPO . |
| WO 93 19445 | 9/1993 | WIPO . |
| WO 96 02434 | 2/1996 | WIPO . |

*Primary Examiner*—Michael W. Ball
*Assistant Examiner*—Jessica Rossi
*Attorney, Agent, or Firm*—Nixon Peabody LLP; Stuart J. Friedman

[57] ABSTRACT

The invention relates to a method of marking an article by transfer from a sleeve of heat-shrink plastics material which is shrunken on the article. According to the method, a transferable element (30) whose free face is coated in a layer (33) of reactivatable adhesive, together with an integrated circuit (40) on said layer, is placed on the inside surface (25) of the film constituting the sleeve (20), after which the sleeve (20) fitted in this way is engaged on the article (10) and is heated so as to shrink said sleeve and press said transferable element together with its integrated circuit onto the facing wall of the article (10), and the adhesive of the layer (33) of reactivatable adhesive is reactivated so that the transferable element (30) adheres to the article (10) and presses the associated integrated circuit (40) against the wall of said article. The invention also provides a sleeve (20) specially designed to implement the above method, having an inside face which includes a transferable element (30) with its free face coated in a layer of reactivatable adhesive and with an integrated circuit on said layer.

13 Claims, 2 Drawing Sheets

METHOD OF MARKING ARTICLES BY TRANSFER FROM A SLEEVE OF HEAT-SHRINKABLE PLASTICS MATERIAL WHICH IS SHRUNK ONTO THE ARTICLE, AND A SLEEVE DESIGNED FOR IMPLEMENTING SAID METHOD

The present invention relates to marking articles, and more particularly to marking an article by transfer from a sleeve or a heat-shrink plastics material which is shrunk onto the article concerned. The article may be of a very wide variety of types, and in particular it may be an article for packaging consumer products such as foods, chemicals, cosmetics, pharmaceuticals, or indeed other products such as CDs.

BACKGROUND OF THE INVENTION

Techniques are already known for marking articles by transferring a pattern printed on the inside face of a sleeve of heat-shrink plastics material, said pattern being transferred by the sleeve being shrunk onto the article concerned. Nevertheless, it should be observed that the transferred pattern is text or graphics printed by means of a special ink suitable for making the transfer (e.g. a sublimable ink), and that once the printed pattern has been transferred onto the article, the sleeve is of no further use and is removed from the article.

The present invention stems from a different approach, seeking to devise a technique for marking articles by transfer from a sleeve of heat-shrink plastics material which is shrunk onto the article, but in which the shrunk sleeve does not constitute a useless temporary medium, but can perform other functions, for example a function of tamperproofing and/or constituting a certificate of origin.

Document WO-A-96/02 434 describes the use of a heat-shrink strip associated with a cover of a container for a pharmaceutical. On the inside, the strip has a transferable portion (e.g. carrying the word "opened") which remains on the edge of the cover on first removal of the strip. An adhesive that is reactivatable by heat is used for transferring the label.

Documents WO-A-93/19 445 and US-A-5 292 018 describe techniques very close to that of the preceding document, with a message portion (or bar code) being transferred when the sleeve is shrunk.

Mention can also be made of document EP-A-0 345 405 which describes a card carrying a piece or medallion to which access is barred by an adhesive film having a hologram stuck to the article: any attempt at opening has the effect of delaminating the hologram, thereby providing the looked-for security.

In addition, security envelopes of heat-shrink plastics material have been known for a long time, in particular for association with the necks of bottles, and designed to constitute a guarantee of tamperproofing for the consumer, guaranteeing that the product concerned has not been subjected to fraudulent substitution or has not been spoiled maliciously. The security envelope heat-shrunk onto the neck of the bottle thus serves as an indicator of tampering in the event of an attempt at forcibly tearing or removing said envelope.

Nevertheless, with that security envelope technique, removal of the envelope, e.g. by pulling on an associated tear strip, leaves no portion or trace of the envelope on the article. Consequently, the function of constituting a certificate of origin remains, in practice, rather limited.

SUMMARY OF THE INVENTION

The invention seeks specifically to solve this technical problem, in particular by devising marking to provide a certificate of origin that is capable of providing the consumer with a complete guarantee, and optionally also making it possible to detect any fraudulent or abnormal manipulation of the sleeve shrunk onto the article, in particular for tamperproofing an article closure device as is required for receptacles.

An object of the invention is thus to devise a technique of marking articles by transfer from a sleeve of heat-shrunk plastics material which is shrunk onto the article that makes it possible, in particular, to provide a function of indicating whether tampering has taken place and/or a function of certifying an origin, in association with a function of packaging the article, in particular to tamperproof a closure device of said article, and also to provide a function of making products traceable.

According to the invention, this problem is solved by a method of marking an article by transfer from a sleeve of heat-shrink plastics material which is shrunken on the article, wherein a transferable element whose free face is coated in a layer of reactivatable adhesive, together with an integrated circuit on said layer, is placed on the inside surface of the film constituting the sleeve, after which the sleeve fitted in this way is engaged on the article and is heated so as to shrink said sleeve and press said transferable element together with its integrated circuit onto the facing wall of the article, and the adhesive of the layer of reactivatable adhesive is reactivated so that the transferable element adheres to the article and presses the associated integrated circuit against the wall of said article.

Thus, such a method makes it possible in simple and reliable manner to transfer a functional element which supports and protects an integrated circuit that provides the function of making a product traceable. This functional element can be an element for certifying origin, in particular a holographic element or a special label, and furthermore this can be done without the transfer being detectable to an observer examining the article in its sleeve and seeing that the certification element is present by transparency. Any attempt at fraudulent or abnormal manipulation of the sleeve that attempts to remove said sleeve will automatically spoil the transferred element at least in part, thus constituting proof of malicious manipulation. If the sleeve is of the security envelope type, i.e. a sleeve that is designed to be opened, e.g. by pulling on a tear strip, in order to gain access to a closure device or the like, then when the safety envelope is removed, the transferred certification element remains in place on the article and performs in full its function of certifying the origin of the product concerned. In addition, any attempt at interfering with the integrated circuit inevitably destroys the transferred element, whether it is holographic or otherwise.

Provision is thus made, prior to engaging the sleeve on the article, to equip the adhesive free face of the transferable element with an integrated circuit (chip) which is thus pressed against the wall of the article when the adhesive of the reactivatable adhesive layer is reactivated. Such an integrated circuit can enable various types of recognition coding or specific recording to be performed, and the masking of said integrated circuit by the transferred element also serves to hide it completely from the eyes of consumers.

Advantageously, the adhesive of the layer of reactivatable adhesive is reactivated simultaneously with the sleeve being heat-shrunk onto the article.

In particular, the adhesive of the layer is heat-reactivatable, with reactivation thereof being performed by heating the sleeve in order to shrink it onto the article. It is then possible to manipulate the sleeve fitted with its transferable element like a traditional sleeve which is put into place in an automatic machine for putting on sleeves and then shrinking them in a heating tunnel. There is thus no need to implement a separate step for reactivating the adhesive of the reactivatable layer.

The invention also provides a sleeve of heat-shrink plastics material for implementing a marking method that presents at least one of the above-specified characteristics. According to the invention, the sleeve includes, on its inside face, a transferable element whose free face is coated in a layer of reactivatable adhesive together with an integrated circuit on said layer.

Preferably, the integrated circuit is organized in such a manner that its outline lies geometrically within the outline of the transferable element. This provides complete discretion and optimum protection to the integrated circuit.

In a particular embodiment, the layer of reactivatable adhesive covers the entire free face of the transferable element so that said element is transferred in full onto the wall of the article on reactivation of the adhesive.

In a variant, it is possible for the layer of reactivatable adhesive to apply to a portion only of the free face of the transferable element so that said element is transferred in part onto the wall of the article following reactivation of the adhesive.

It is also advantageous to provide for the adhesive layer to be heat-reactivatable, and in particular to be reactivatable at a temperature equal or close to the temperature at which the sleeve of heat-shrink thermoplastic material shrinks.

In a particular embodiment, the transferable element is constituted by a metallized flat shape carried by a support layer of transparent plastics material adhering to the inside face of the sleeve, the metallized shape being bonded to said support layer by a transfer bonding layer enabling said metallized shape to be totally or partially dissociated therefrom for transfer onto the wall of the article and for adhesion thereof on said wall on reactivation of the layer of reactivatable adhesive.

Advantageously, in this case, the metallized flat shape is constituted by a layer of holographic metallization. In particular, the layer of holographic metallization has an appearance that is mainly silver-colored or gold-colored so as to make it easier to recognize visually.

In this context, it is appropriate to observe that it is known to make security envelopes in which the sleeve is fitted on its inside face with a holographic element and with a tear strip passing behind the holographic element so as to tear said element when the envelope is opened by pulling on said strip. However in those prior techniques, the holographic element is indissociably bonded to the envelope, and it is split into two segments each of which remains on the envelope, on either side of the tear gap, without leaving any trace on the article. In contrast, the marking technique of the invention implies that the holographic metallization layer is transferred at least in part and adheres to the wall of the article.

BRIEF DESCRIPTION OF THE DRAWINGS

Other characteristics and advantages of the invention appear more clearly in the light of the following description and the accompanying drawings relating to a particular embodiment, given with reference to the figures in which.

DETAILED DESCRIPTION OF THE INVENTION

Figure 1:
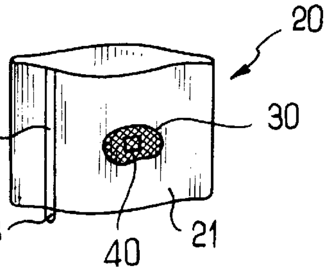
FIG. 1 is a perspective view of a sleeve of heat-shrink plastics material fitted on its inside face, in accordance with the invention, with a transferable element that is represented as being in the form of a patch, behind which an integrated circuit is placed (represented by a square)

FIG. 1 shows a sleeve 20 of heat-shrink plastics material in the form it can take up when cut from a continuous sheath, with the film constituting said sleeve referenced 21 being looped via a generator line by bonding in a manner that is not shown herein but that is well known in the technique of making heat-shrunk sleeves as used in the field of packaging. In a traditional technique, the sleeve 20 can be fitted on its inside face with a tear strip 22 having an end referenced 23 for grasping to enable a user to pull the strip in order to open the sleeve that has been shrunk onto the article.

According to an essential characteristic of the invention, the sleeve 20 has, on its inside face, a transferable element referenced 30 whose free face is coated in a layer of reactivatable adhesive, together with an integrated circuit 40 on said layer. The element 30 is shown here as being in the form of a substantially circular patch and the integrated circuit is shown in the form of a small square, but naturally the invention is not limited in any way to any particular shape for the transferable element or for the integrated circuit.

Figure 2:
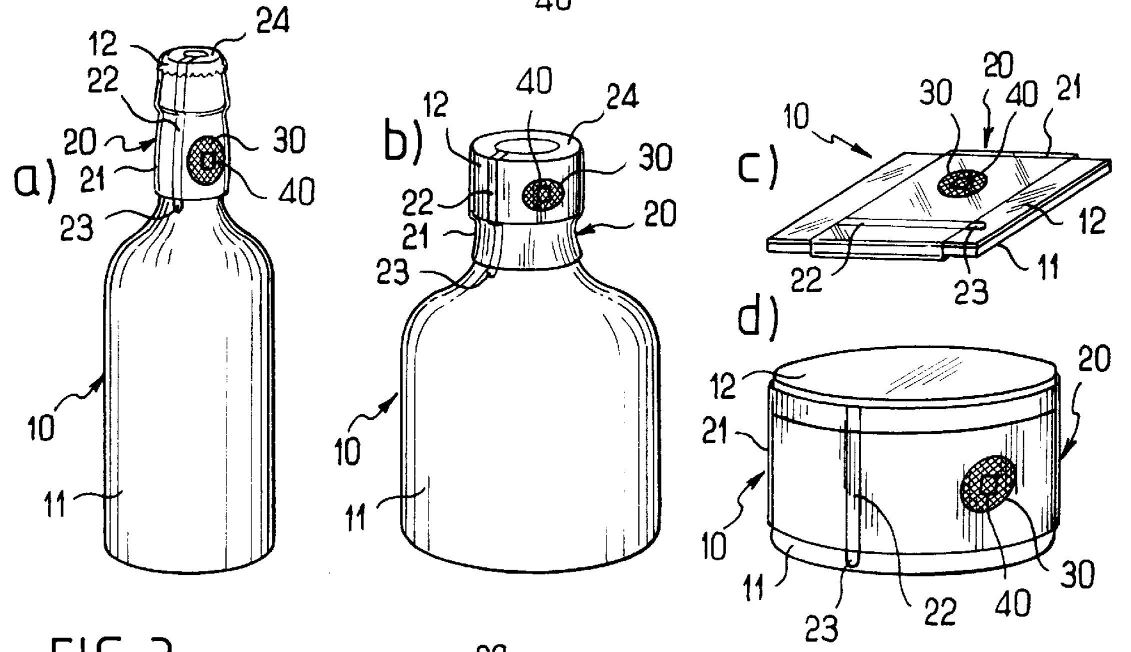
FIG. 2 shows various types of articles fitted with a sleeve identical or analogous to that of FIG. 1 and shrunk onto a predetermined portion of the article.

FIG. 2 shows several types of articles by way of example, each of the articles in this case being fitted with a respective closure device with the sleeve being shrunk onto the article in the vicinity of the closure device so as to provide tamperproofing.

At a), there is shown an article 10 in the form of a bottle whose body 11 is surmounted by a crown cap 12. At b), the article 10 is a flask whose body 11 is surmounted by a stopper 12 that is screw-fastened or snap-fastened. At c), the article 10 is a flat case whose body 11 is surmounted by a cover 12, in particular a hinged cover (where such an article is constituted, for example, by a CD case). At d), the article 10 is a receptacle whose body 11 is surmounted by a cap 12, optionally a screw cap. In all of these cases, the article 10 is fitted with a sleeve 20 that has been shrunk onto its wall, closely surrounding the portion of the article that corresponds to the zone occupied by its closure device. For the articles shown at a) and b), a sleeve is drawn whose top margin overlies the top face of the cap or stopper 12 in the form of a ring referenced 24.

Naturally, the examples shown in FIG. 2 are merely illustrative, and the invention is not limited in any way to one particular type of article, and when the article is a receptacle, it is not limited to one particular type of closure device. In particular, the shrunk sleeve may be designed to remain on the wall of the article without necessarily being tearable.

In FIG. 2, each sleeve 20 is shrunk onto the wall of the corresponding article and the associated element 30 is transferred and stuck onto the facing wall of the article, thereby protecting the associated integrated circuit 40.

In FIG. 2, the element 30 is transferred either onto the side wall of the body 11 (for the articles shown at a) and at d)), or else onto the side wall of the cap or cover 12 (articles shown at b) and c)).

When the sleeve is shrunk onto the article, as shown in the examples of FIG. 2, it is not possible to see that the element 30 (which is visible by transparency) has, in fact, been transferred onto the wall of the article. However, after the sleeve has been opened in normal manner, in this case by using the tear strip 22, the element 30 that has been transferred remains at least in part on the article, thus providing the desired function of certifying origin like a genuine seal, and as is shown in FIG. 3.

Figure 3:
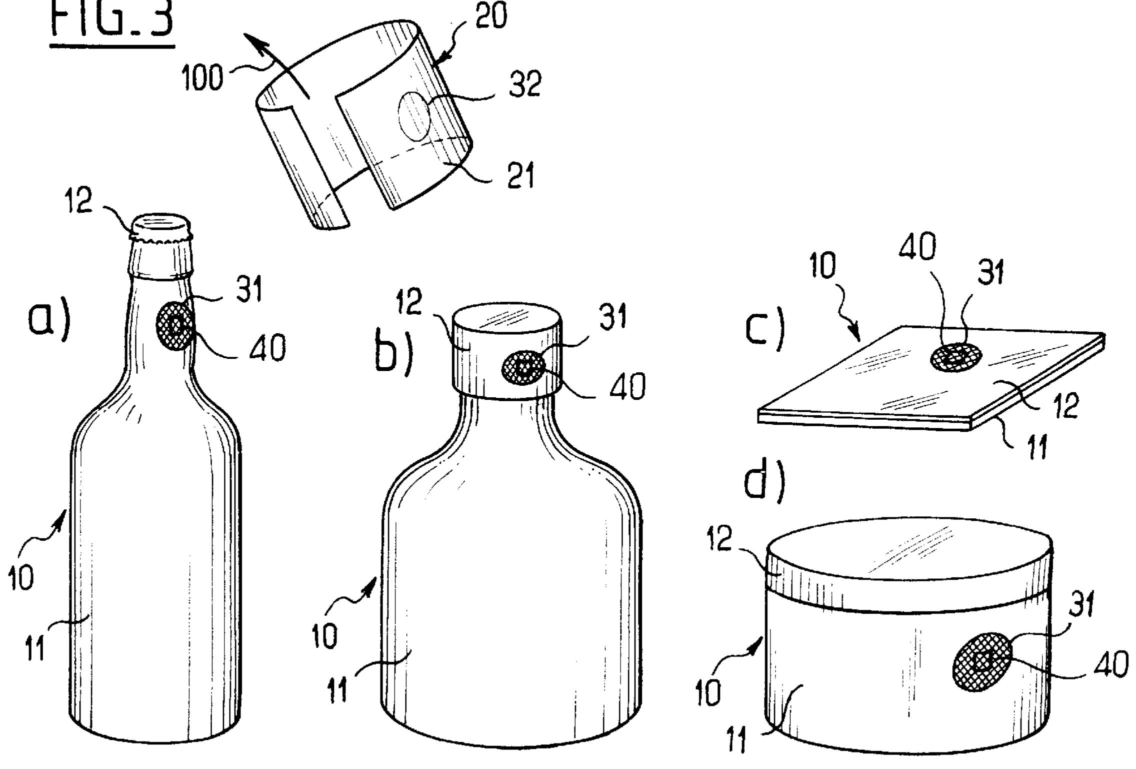
FIG. 3 shows removal of the sleeve, in this case after pulling on an associated tear strip, leaving on each article of FIG. 2, the element which has been transferred to the article and which covers the integrated circuit, in particular for the purpose of constituting an element certifying its origin and associated with the product concerned.

In FIG. 3, there can be seen an open sleeve 20 with removal thereof being represented by arrow 100. The articles 10 shown at a), b), c), and d), correspond to those shown in FIG. 2, and each of them carries on its wall the element that has been transferred by reactivation of the associated adhesive.

Specifically, a transferable element of multilayer structure is shown, i.e. a portion referenced 31 is indeed transferred onto the article 10 by implementing the method of the invention, while a portion referenced 32 remains bonded to the sleeve which is removed. Such a structure is described in greater detail below with reference to FIG. 6.

It is thus possible to implement the marking method of the invention whereby a transferable element 30 having its free face coated in a layer of reactivatable adhesive together with an integrated circuit 40 on said layer is disposed on the inside surface of the film 21 constituting the sleeve 20, after which the sleeve 20 fitted in this way is heated and placed around the article 10 so as to cause said sleeve to shrink and press said transferable element together with its integrated circuit against the facing wall of the article 10, and the adhesive of the reactivatable adhesive layer is reactivated so that the transferable element 30 adheres to the article 10 and presses the associated integrated circuit 40 against the wall of said article.

The adhesive of the reactivatable adhesive layer is preferably reactivated simultaneously with the sleeve 20 being heat-shrunk onto the article 10. In particular, the adhesive can be reactivatable by means of heat, and its reactivation can be performed by the heating of the sleeve 20 for the purpose of shrinking onto the article 20. Under such circumstances, the adhesive material selected is reactivatable at a temperature that is equal to or close to the shrinking temperature of the sleeve. This takes good advantage of the mechanical effect associated with the shrinking of the sleeve which exerts a pressure forced directed against the wall of the article, and of the heating effect associated with reactivating the adhesive, with the combination of these effects giving rise to optimum transfer.

Figure 4:
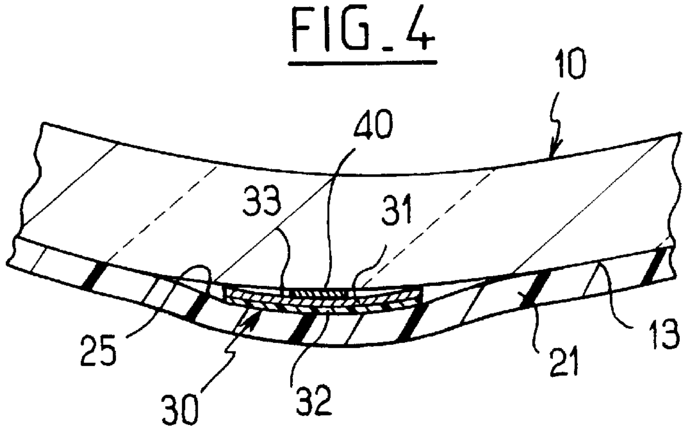
FIG. 4 is a detail section showing the wall of an article covered by a shrunk sleeve fitted with its transferable element which is then transferred to the wall of the article following reactivation of the associated adhesive.

FIG. 4 shows in greater detail the organization of a sleeve 20 in accordance with the invention when it is in its shrunk state on the wall of an article. The structure of the transferable element 30 is represented briefly (surrounding the associated integrated circuit 40), together with a support layer 32 of transparent plastics material adhering to the inside face referenced 25 of the film 21 constituting the sleeve 20, and together with a flat metallized shape referenced 31 which is constituted in this case by a layer of holographic metallization that is carried by the support layer 32. Unlike known techniques, the layer 31 of holographic metallization is transferable and it adheres via at least one zone 33 to the wall referenced 13 of the article 10.

Figure 5:
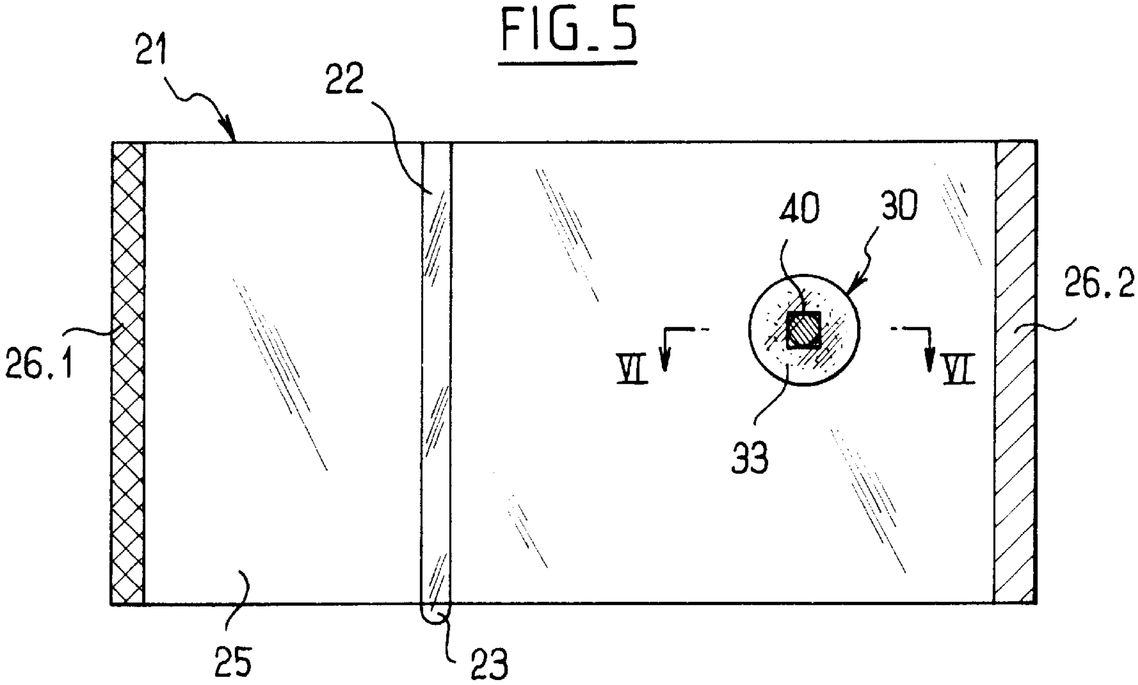
FIG. 5 is a plan view showing the developed inside surface of the above-mentioned sleeve, together with its transferable element, and showing the integrated circuit fitted thereto.

When the film 21 constituting the sleeve is flat, its inside face 25 is as shown in the illustration of FIG. 5.

This figure shows the presence of the transferable element 30 with the layer 33 constituting a layer of reactivatable and in particular heat-reactivatable adhesive on its free face, and also the tear strip 22 together with its end 23 for grasping. There can also be seen two end strips referenced 26.1 and 26.2 which are superposed one on the other when the sleeve is formed, with the overlap zone corresponding to the bonding which forms said sleeve.

There can also be seen the integrated circuit 40 disposed on the adhesive free face 33 of the transferable element 30, with the outline thereof lying in this case geometrically within the outline of said transferable element. The integrated circuit 40 must naturally be put into place on the transferable element 30 before the sleeve is placed on the article.

Figure 6:
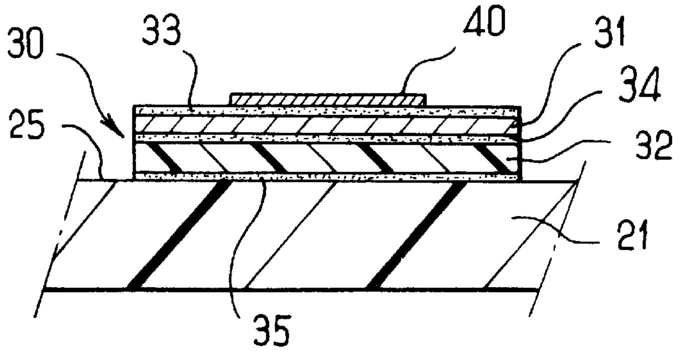
FIG. 6 is a section on VI—VI of FIG. 5 on a larger scale for showing more clearly the multilayer structure of the transferable element associated with the inside wall of the sleeve of heat-shrunk plastics material.

FIG. 6 shows more clearly the multilayer structure of the transferable element 30 together with its integrated circuit 40 which is associated with the inside wall 25 of the film 21 constituting the sleeve 20 of heat-shrinkable plastics material.

The transferable element 30 includes a metallized shape 31, e.g. constituted by a layer of holographic metallization, and carried by a support layer 32 of transparent plastics material, which layer adheres to the inside face 25 via a thin layer of adhesive 35, e.g. a transparent hot-stick varnish. The support layer 32 may be made, for example, out of polyethylene or out of polyethylene teraphthalate.

Unlike known holographic elements, the layer 31 of holographic metallization firstly presents on its free face a layer 33 of reactivatable adhesive, and secondly is bonded to the support layer 32 by a transfer bonding layer 34 enabling the layer 31 of holographic metallization to be totally or partially dissociated therefrom in order to be transferred onto the wall 13 of the article and in order to enable it to stick to said wall once the adhesive layer 33 has been reactivated, following reactivation of said layer 33, in particular by means of heat if a heat-reactivatable adhesive is used. It makes the free face of the layer 31 of holographic metallization adhesive relative to the wall of the article and it adheres thereto more strongly than the holding force imparted by the transfer bonding layer 34, which layer may be constituted in the form of a transfer varnish, e.g. based on repulsive agents (such a varnish also being known as a "release" varnish). Thus, if an appropriate heat-reactivatable adhesive is used, the heat which accompanies heat-shrinking of the sleeve 21 has the effect of reactivating the adhesive layer 33 which then causes the layer 31 of holographic metallization to adhere intimately to the wall of the article. As mentioned above, the heat-reactivatable adhesive is selected to have a reactivation temperature that is equal or close to the shrinking temperature of the sleeve: this ensures that the operations of shrinking the sleeve and of transferring the transferable element and causing it to adhere take place simultaneously.

The element 30 may be transferred in full, in which case the hot reactivatable adhesive layer 33 covers the entire free face of the layer 31 of holographic metallization. In a variant, the transfer may relate to a portion only of the element 30, in which case the adhesive layer 33 relates to a portion only of the free face of the layer 31. The transferred portion of the element 30 can then be organized to form a predetermined pattern (not shown herein). In which case, when the sleeve 20 is removed, the transferred portion of the pattern is to be found on the article while the non-transferred portion is removed together with the torn wall of the sleeve.

The transferable element 30, or more precisely its layer 31 of holographic metallization, can have an appearance that is mainly silver-colored or gold-colored, thereby making it easier to recognize the transferred portion of said element on sight.

When the sleeve 20 is shrunk onto the article, the integrated circuit 40 is also firmly pressed against the wall of the article 10 while the sleeve is being shrunk and the adhesive of the layer 33 is reactivated. The integrated circuit 40 is thus held firmly against the wall of the article while being protected by the wall of the sleeve, and also remains invisible from the outside providing, as in this case, the outline of the integrated circuit is designed to lie geometrically within the outline of the transferable element 30. It is thus possible to provide for encoding a promotional message or for detection by an appropriate system (the wall of the sleeve being completely inert relative to writing or reading information stored in the integrated circuit). It should be observed that destroying the element that is transferred onto the article will also destroy the integrated circuit 40, thereby providing an additional degree of security. Conversely, any attempt at interfering with the integrated circuit will automatically have the effect of destroying the transferred element, regardless of whether it is holographic or otherwise.

Thus, for the first time, the function of identification for the consumer (possibly with included security) has been combined with the function of making products traceable for professionals (by means of the integrated circuit which is supported and protected by the transferred element).

Furthermore, although security envelopes have been shown in which each is fitted with a single transferable element 30, it would naturally be possible to provide a sleeve that is fitted with plurality of transferable elements 30.

The invention is not limited to the embodiments described above, but on the contrary covers any variant using equivalent means to reproduce the essential characteristic specified above.

What is claimed is:

1. A method of marking an article by transfer from a sleeve of heat-shrink plastics material which is shrunken on the article, wherein a transferable element (30) whose free face is coated in a layer (33) of reactivatable adhesive, together with an integrated circuit (40) on said layer, is placed on the inside surface (25) of the film constituting the sleeve (20), after which the sleeve (20) fitted in this way is engaged on the article (10) and is heated so as to shrink said sleeve and press said transferable element together with its integrated circuit onto the facing wall of the article (10), and the adhesive of the layer (33) of reactivatable adhesive is reactivated so that the transferable element (30) adheres to the article (10) and presses the associated integrated circuit (40) against the wall of said article.

2. A method according to claim 1, wherein the integrated circuit (40) is previously disposed on the layer (33) of reactivatable adhesive in such a manner that the outline of said circuit lies geometrically within the outline of the transferable element (30).

3. A method according to claim 1, wherein the adhesive of the layer (33) of reactivatable adhesive is reactivated simultaneously with the sleeve (20) being heat-shrunk onto the article (10).

4. A method according to claim 3, wherein the adhesive of the layer (33) is heat-reactivatable, with reactivation thereof being performed by heating the sleeve (20) in order to shrink onto the article (10).

5. A sleeve (20) of heat-shrinkable plastics material for marking an article by transfer from said sleeve, said sleeve comprising, on its inside face (25), a transferable element (30) whose free face is coated in a layer (33) of reactivatable adhesive together with an integrated circuit (40) on said layer.

6. A sleeve (20) according to claim 5, wherein the integrated circuit (40) is organized in such a manner that its outline lies geometrically within the outline of the transferable element (30).

7. A sleeve (20) according to claim 5, wherein the layer (33) of reactivatable adhesive covers the entire free face of the transferable element (30) so that said element is transferred in full onto the wall of the article (10) on reactivation of the adhesive.

8. A sleeve (20) according to claim 5, wherein the layer (33) of reactivatable adhesive applies to a portion only of the free face of the transferable element (30) so that said element is transferred in part onto the wall of the article (10) following reactivation of the adhesive.

9. A sleeve (20) according claim 5, wherein the layer (33) of adhesive is reactivatable by heat.

10. A sleeve (20) according to claim 9, wherein the heat-reactivatable adhesive constituting the layer (33) is reactivatable at a temperature that is equal to or close to the shrinkage temperature of said sleeve.

11. A sleeve (20) according to claim 5, wherein the transferable element (30) is constituted by a metallized flat shape (31) carried by a support layer (32) of transparent plastics material adhering to the inside face of the sleeve, the metallized shape (31) being bonded to said support layer (33) by a transfer bonding layer (34) enabling said metallized shape to be totally or partially dissociated therefrom for transfer onto the wall of the article (10) and for adhesion thereof on said wall on reactivation of the layer (33) of reactivatable adhesive.

12. A sleeve (20) according to claim 11, wherein the metallized flat shape (31) is constituted by a layer of holographic metallization.

13. A sleeve (20) according to claim 12, wherein the layer of holographic metallization (31) is of an appearance that is mainly silver-colored or gold-colored.

* * * * *